C. M. Drennan,

Egg-Beater,

N° 58,165. Patented Sept. 18, 1866.

Witnesses,

Rich'd Edw. Parker
Henry E. Parker

Inventor;

C. M. Drennan

UNITED STATES PATENT OFFICE.

CHARLES M. DRENNAN, OF BOSTON, ASSIGNOR TO WM. P. AND ISAAC GANNETT, OF ROXBURY, MASSACHUSETTS.

IMPROVED EGG-BEATER.

Specification forming part of Letters Patent No. 58,165, dated September 18, 1866.

*To all whom it may concern:*

Be it known that I, CHARLES M. DRENNAN, of Boston, in the county of Suffolk and State of Massachusetts, have invented a new and useful Implement for Beating Eggs; and I do hereby declare the following to be a full, clear, and exact description thereof, reference being had to the accompanying drawings, in which—

Figure 1:
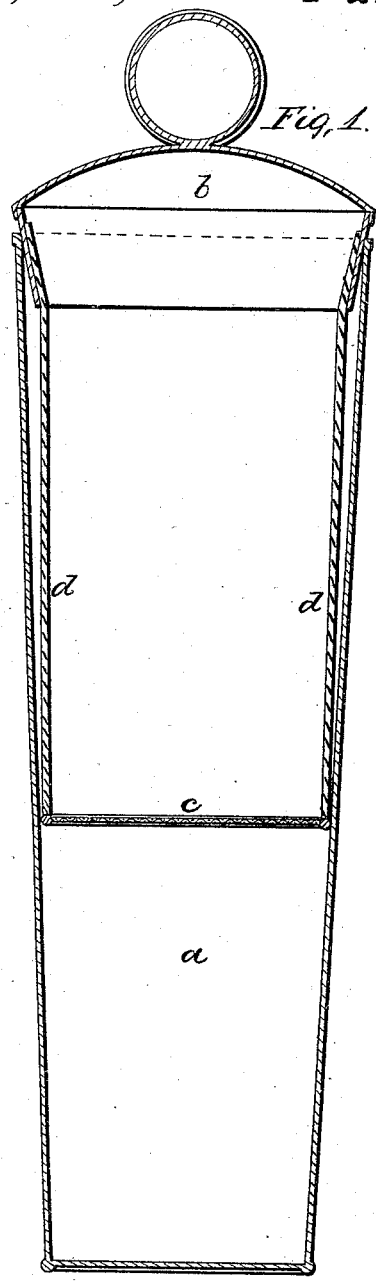
Figure 2:
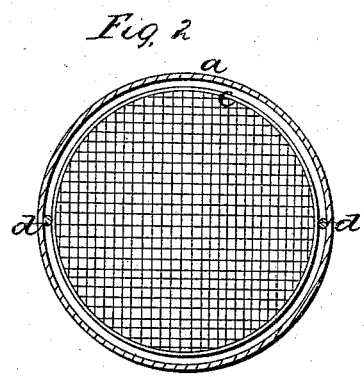

Figure 1 is a vertical section, and Fig. 2 a horizontal section, of my invention.

In the drawings, $a$ represents a cylindrical vessel of any desired or proper dimensions, having a cover or lid, $b$, to shut tightly into its mouth. A diaphragm, $c$, composed of wire-gauze or its equivalent material, is connected with the cover $b$ by two or more rods, $d\ d$, which should be of such a length as to allow the diaphragm to extend into the vessel $a$ about two-thirds of its depth.

In operating with the above-described implement, the eggs are to be placed in the vessel $a$ and the diaphragm and cover inserted in place. The implement is then to be grasped in the hand and shaken back and forth briskly for a few seconds, when the eggs will be found to be thoroughly beaten by being forced through the diaphragm.

The above-described apparatus is very simple and cheap in its construction and quick in its operation, ten seconds sufficing to beat three or four eggs sufficiently to allow of their being strained.

I claim—

The gauze diaphragm $c$, when supported and inserted by the wires $d\ d$, attached to the cover, as and for the purpose specified.

C. M. DRENNAN.

Witnesses:
CHAS. EDWD. PARKER,
HENRY E. PARKER.